UNITED STATES PATENT OFFICE.

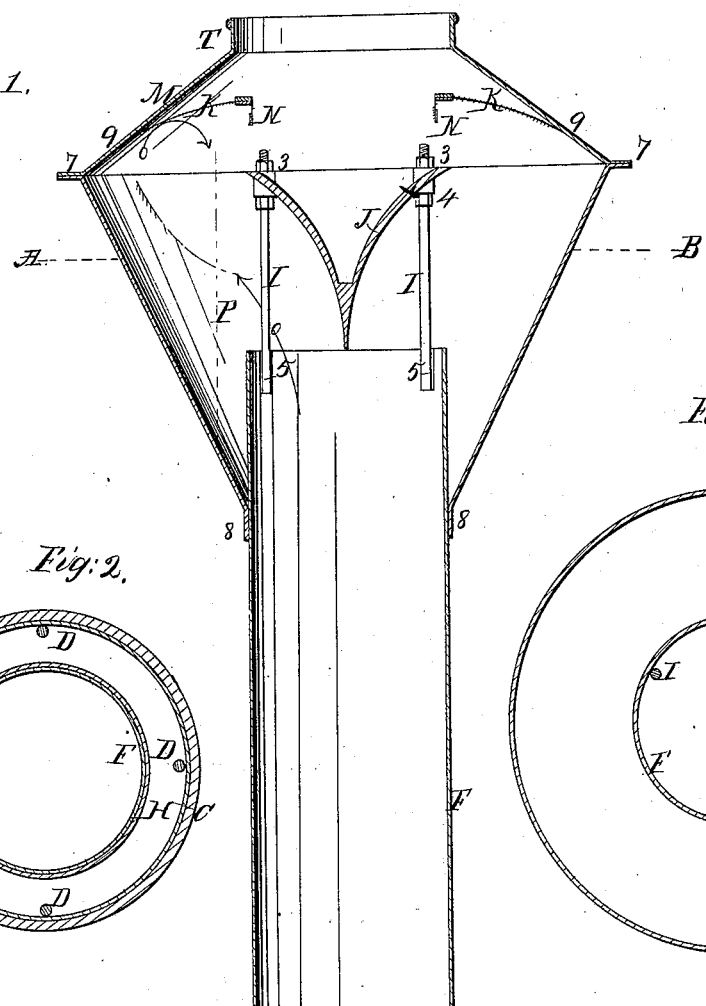

C. F. JAURIET, OF AURORA, ASSIGNOR TO HIMSELF AND A. I. AMBLER, OF CHICAGO, ILLINOIS.

IMPROVEMENT IN SPARK-ARRESTERS.

Specification forming part of Letters Patent No. 52,362, dated January 30, 1866.

*To all whom it may concern:*

Be it known that I, CHARLES F. JAURIET, of Aurora, in the county of Kane and State of Illinois, have invented a new and useful Improvement in Smoke-Stacks for Locomotives, and other purposes; and I do hereby declare that the following is a full, clear, and exact description of the same, reference being had to the accompanying drawings, forming part of this specification, in which—

Figure 1 is a vertical central section of a locomotive smoke-stack constructed in accordance with my invention. Fig. 2 is a horizontal section in the line C D of Fig. 1. Fig. 3 is also a horizontal section, taken through the line A B of Fig. 1.

Similar letters of reference in the several figures indicate corresponding parts.

The nature of my invention consists—

First, in a concave net-work or finely perforated partition between the conical or curved cap of the stack and the upper end of the central pipe, the said partition having a central draft-passage through it corresponding with the passage of the central pipe, and with the passage in the center of the conical cap. By arranging a net-work partition in the manner I have shown the draft is not impaired, as the steam can readily sift through the meshes thereof; but while this is the case the sparks will be perfectly arrested, and the smoke and steam will be compelled to escape at the center of the conical cap, as the imperforated cap will prevent their escape at any other point.

Second, in the construction of the deflecting-cone, which is placed upon the central pipe, of a form which in section vertically at all points is concave from its inverted apex to its base, in combination with a concave net-work or finely-perforated partition, constructed and applied within the smoke-stack, as hereinafter described. By the peculiar form of the cone the sparks have a deflection in a curved line first imparted to them, and this deflection is such that the concave surface of the partition continues the deflection in a similar course. This form of cone also offers less obstruction to the draft just above the upper end of the central pipe than a cone with straight sides. It also presents a greater amount of deflecting-surface than a cone with straight sides.

Third, in the construction and combination of a spark-chamber which terminates at its lower end upon a central pipe at a point far above the base of said pipe, with strong saddle, a conic tubular brace, a base flange of the saddle, and connecting screw bolts or legs, all as hereinafter described, whereby a very firm and substantial connection of the stack, although the spark-chamber does not serve as one of the means of connection, is effected in a very cheap and convenient manner.

Fourth, in a novel manner attaching the cone to the central pipe by means of screw-rods, bosses, and nuts, whereby the cone may be removed and again replaced, or it may be adjusted to a greater or less height above the upper end of the central pipe, so as to regulate the draft.

To enable others skilled in the art to make and use my invention, I will proceed to describe the same with references to the drawings.

B represents the saddle, and A the collar, which is attached to the boiler in the usual manner. In the construction of the saddle I form a shoulder, H, and thus make a seat for the lower end of the central pipe, F. This shoulder secures the pipe against lateral movement on its seat. I also form a flange or platform, W, around the upper end of the tube of the saddle, and on the outer edge of this flange an enlargement, E, which forms a raised shoulder, is formed as represented.

C is a strong and substantial tube, of bell-form, or a form approximating to a cone, attached to the lower end of the central pipe, F, so as to inclose said end of this pipe, as represented. The bolts 2 2 are the means by which the tube C is fastened to the pipe F. On the inner circumference of the tube C a number of stay or connecting bolts, D, with screw-threads on their lower ends, are attached, as shown, by means of bolts 6 6. The tube C fits down upon the ring-platform W, within the shoulder E, and its connecting-bolts D extend down through the platform W and are furnished with retaining-nuts G, as shown.

The platform W, base C, bolts D, and shoulders H E enable me to give a strong support and a firm seat to the stack, and also enable me to greatly shorten the spark-chamber.

Were the central tube not encircled by the tube C it would be necessary to extend the spark-chamber down to the base, as in Saml. Sweet's patent, in order to secure the required support for the stack.

Smoke-stacks are liable to get loose by reason of the great strain experienced from the continued motion of the locomotive and the resistance of the atmosphere; and hence the value and importance of my invention will be evident. If the spark-chamber extended down to the base-support or saddle the amount of surface exposed to the atmosphere would be greatly increased, and therefore the strain upon the saddle connections and supports would be much greater than with the construction of spark-chamber I have shown.

L represents the short spark-chamber above alluded to. It is in form of an inverted cone and with its apex cut off. This chamber encircles by its lower end the upper end of the central pipe, F, and extends upward with a considerable flare some distance above the top of said pipe, as shown, and is securely sustained on the pipe by means of bolts 8 8, as represented. On top of this chamber a conical or concaved hood or cap, M, is fastened by bolts 7 7. The tip of this hood is cut off, and the metal is bent outward into a cylindrical form, so as to form a collar or rim, T, around the central opening left in said hood, as shown.

K is the wire or net-work partition, of concave form, and with a central passage through it, which is employed as a shield to prevent the escape of the sparks from the opening in the top of the hood M. This net-work or finely-perforated partition is attached to the inside of the hood by means of rivets 9. It is so shaped and arranged with respect to the surface of the hood that a free space between the hood and its upper surface is formed, as shown.

N, shown by red lines, indicates a rim-netting, used only when wood is consumed as fuel.

J is the deflecting-cone, placed upon standards I I of the central pipe, F. This cone is used in an inverted position. Its surface at all points is concave. Its largest diameter or base is about equal to the diameter of the discharge of the central pipe, F. The inverted tip of the cone is sharp, and extends down about even with the top of the central pipe. The standards which support this cone are bolts or rods with screws on their upper ends, the lower ends of said rods being bolted, as at 5 5, to the inside of the central pipe, F. The cone is fitted to these rods by means of bosses or boxes formed on it, as shown, the rods passing through the boxes, and nuts 3 and 4 retaining the cone at any desired point on the rods. By setting up the nuts the cone can be set at a different height from that shown, or by setting down the nuts the cone can be set lower than shown. The nuts and screw-bolts allow the cone to be readily removed when necessary. The cone gives a diverging direction to the sparks as they proceed upward through the stack.

Operation: After my smoke-stack is constructed as above described and attached to the boiler in the usual manner it will operate without further attention. The sparks, as they pass upward through the pipe F, will diverge, as illustrated by the darts o o, and strike against the netting K, and be caused to fall down upon the inner surface of the spark-chamber, as shown by the dotted line P; and if again carried upward, the sparks will continue to be thrown against the net-work and surface of the spark-chamber until the fire in them will become extinct. During this operation the smoke and steam will have a free escape through the net-work and other outlets of the stack and a perfect draft will also be maintained.

What I claim as my invention, and desire to secure by Letters Patent, is—

1. The combination of the cap or hood M and the net-work or finely-perforated partition K, substantially as and for the purpose described.

2. The arrangement of the cone J with the net-work partition K, or their equivalents, constructed and applied to the spark-arrester or smoke-stack, substantially as and for the purpose set forth.

CHAS. F. JAURIET.

Witnesses:
  A. A. JOHNSON,
  A. BAUER.